US009063947B2

(12) United States Patent
Forman et al.

(10) Patent No.: US 9,063,947 B2
(45) Date of Patent: Jun. 23, 2015

(54) DETECTING DUPLICATIVE HIERARCHICAL SETS OF FILES

(75) Inventors: George H. Forman, Port Orchard, WA (US); Kave Eshghi, Los Altos, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 1348 days.

(21) Appl. No.: 12/258,316

(22) Filed: Oct. 24, 2008

(65) Prior Publication Data

US 2010/0114842 A1 May 6, 2010

Related U.S. Application Data

(60) Provisional application No. 61/089,657, filed on Aug. 18, 2008.

(51) Int. Cl.
G06F 17/30 (2006.01)

(52) U.S. Cl.
CPC ...... *G06F 17/30156* (2013.01); *G06F 17/3033* (2013.01)

(58) Field of Classification Search
CPC .............. G06F 11/1453; G06F 3/0641; G06F 17/30156; G06F 17/30067; G06F 17/30949
USPC .................................. 707/687–704, 736–758
See application file for complete search history.

(56) References Cited

U.S. PATENT DOCUMENTS

| | | | | |
|---|---|---|---|---|
| 5,990,810 A * | 11/1999 | Williams | ......................... | 341/51 |
| 6,381,601 B1 * | 4/2002 | Fujiwara et al. | .............. | 707/692 |
| 6,594,665 B1 * | 7/2003 | Sowa et al. | ........................... | 1/1 |
| 6,754,799 B2 * | 6/2004 | Frank | ............................. | 711/216 |
| 7,315,865 B1 * | 1/2008 | Jernigan, IV | ................. | 707/754 |
| 7,555,559 B2 * | 6/2009 | Chapweske | .................... | 709/232 |
| 7,624,095 B2 * | 11/2009 | Majumder | .................... | 705/7.29 |
| 7,711,760 B2 * | 5/2010 | Williams | ....................... | 707/825 |
| 7,797,323 B1 * | 9/2010 | Eshghi et al. | ................. | 707/737 |
| 7,860,855 B2 * | 12/2010 | Hussami | ........................ | 707/708 |
| 7,921,110 B1 * | 4/2011 | Ting et al. | ..................... | 707/736 |
| 8,176,018 B1 * | 5/2012 | Bisson et al. | ................. | 707/690 |
| 8,185,507 B1 * | 5/2012 | Kaminski, Jr. | ................ | 707/698 |

(Continued)

FOREIGN PATENT DOCUMENTS

| | | |
|---|---|---|
| WO | WO2006094365 A1 | 9/2006 |
| WO | WO2006094366 A1 | 9/2006 |
| WO | WO2006094367 A1 | 9/2006 |

OTHER PUBLICATIONS

Bolosky et al., 4th USENIX Windows Systems Symposium Paper 2000, pp. 13-24 of the Proceedings, Single Instance Storage in Windows 2000, Aug. 2000 (12 pages).

(Continued)

*Primary Examiner* — Michelle Owyang
(74) *Attorney, Agent, or Firm* — Trop, Pruner & Hu, P.C.

(57) ABSTRACT

To detect duplicative hierarchically arranged sets of files in a storage system, a method includes generating, for hierarchically arranged plural sets of files, respective collections of values computed based on files in corresponding sets of files. For a further set of files that is an ancestor of at least one of the plural sets of files, a respective collection of values that is based on the collection of values computed for the at least one set is generated. Duplicative sets according to comparisons of the collections of values are identified.

23 Claims, 3 Drawing Sheets

(56) References Cited

U.S. PATENT DOCUMENTS

| | | | |
|---|---|---|---|
| 2001/0034795 A1* | 10/2001 | Moulton et al. | 709/244 |
| 2001/0037323 A1* | 11/2001 | Moulton et al. | 707/1 |
| 2001/0042221 A1* | 11/2001 | Moulton et al. | 714/5 |
| 2001/0044879 A1* | 11/2001 | Moulton et al. | 711/114 |
| 2002/0010797 A1* | 1/2002 | Moulton | 709/247 |
| 2002/0048284 A1* | 4/2002 | Moulton et al. | 370/500 |
| 2002/0152218 A1* | 10/2002 | Moulton | 707/100 |
| 2003/0120647 A1* | 6/2003 | Aiken et al. | 707/3 |
| 2005/0120137 A1* | 6/2005 | Moulton et al. | 709/244 |
| 2005/0256864 A1* | 11/2005 | Semerdzhiev | 707/5 |
| 2006/0259587 A1* | 11/2006 | Ackerman et al. | 709/219 |
| 2007/0005556 A1* | 1/2007 | Ganti et al. | 707/1 |
| 2007/0043757 A1* | 2/2007 | Benton et al. | 707/102 |
| 2007/0050423 A1* | 3/2007 | Whalen et al. | 707/200 |
| 2008/0028468 A1* | 1/2008 | Yi et al. | 726/23 |
| 2009/0063455 A1* | 3/2009 | Li et al. | 707/5 |

OTHER PUBLICATIONS

Broder et al., Min-Wise Independent Permutations, 2000 (36 pages).
Gantz et al., IDC White Paper—The Expanding Digital Universe, Mar. 2007 (24 pages).
Forman et al., Finding Similar Files in Large Document Repositories, Aug. 2005 (7 pages).
Forman et al., HP Labs, Efficient Detection of Large Scale Redundancy in Enterprise File Systems, Dec. 2008 (9 pages).
Infostor.com, Tip Survey Reveals Storage Trends, Mar. 2008 (5 pages).

* cited by examiner

BI-PARTITE GRAPH

DETECTING DUPLICATIVE HIERARCHICAL SETS OF FILES

BACKGROUND

At large enterprises (such as large companies, educational facilities, government agencies, and so forth), the cost of storing data is becoming an increasing concern. A large enterprise may have to provide sufficient storage resources to store relatively massive amounts of data. The costs of storing data include costs associated with the following: hardware and associated software for storage systems, office and data center real estate, information technology personnel, power resources, cooling resources, network resources for moving data, and so forth.

A good portion of data growth is attributable to duplication of data. While some duplication of data is used for purposes of data protection or caching, other types of duplication are wasteful. For example, various employees of an enterprise may individually download the same large data files to different storage locations.

BRIEF DESCRIPTION OF THE DRAWINGS

Some embodiments of the invention are described, by way of example, with respect to the following figures.

DETAILED DESCRIPTION

In accordance with some embodiments, a technique or mechanism is provided for detecting duplication of hierarchically arranged sets of files in a storage system. A set of files refers to any collection of files, such as a directory of files. A "file" can refer to any data object (e.g., a document, a bitmap, an image, an audio clip, a video clip, software source code, software executable code, etc.). A "file" can also refer to a directory (a structure that contains other files).

Sets of files are considered to be hierarchically arranged if there is at least one set of files that has a predefined relationship with another set of files, such as a containment relationship (an ancestor that contains a descendent, a parent that contains a child, and so forth). Sets of files are considered to be duplicative if the sets share more than some number of overlapping files (based on some similarity measure). For example, a first directory that is an exact copy of a second directory would be considered to be duplicative of the second directory. Moreover, even if there has been some modification of the first directory or second directory such that the first and second directories are no longer exact copies, the two directories would still be considered to be duplicative if they share some number (based on a similarity measure) of the same files.

In accordance with some embodiments, to detect duplicative hierarchically arranged sets of files, sketches are computed for each set of files (e.g., for each directory). A "sketch" refers to a collection of values that are computed based on the files contained in the set (e.g., directory). For example, the collection of values can be a collection of integers, a collection of hashes, and so forth. The collection of values can be a vector of values or some other data structure of values.

Due to the hierarchical arrangement of the sets of files, sketches computed for an ancestor are based on sketches of descendents of the ancestor. As a result, improved computational efficiency can be achieved in computing sketches for ancestor (or higher level) sets of files. Duplicative sets of files are identified based on comparisons of the sketches.

In the ensuing discussion, reference is made to directories. Note, however, that the same or similar techniques can be applied to other types of sets of files.

Identifying duplicative directories allows an enterprise's personnel to more efficiently make use of their time in taking some action with respect to the duplicative directories. This is contrasted to a technique in which large identical files are identified. Although it is relatively easy to identify duplicative files, it is often the case that a relatively large number of occurrences of duplicative files will be found. Having to make many individual decisions regarding what actions to take with respect to the large number of occurrences of duplicative files can be labor intensive and time consuming. A common type of duplication is copying entire directories, copying entire archives (archives are considered to be directories or a compressed file representing directories and their files), and so forth. Being able to identify duplicative directories may enable more efficient use of storage capacity.

Figure 1:
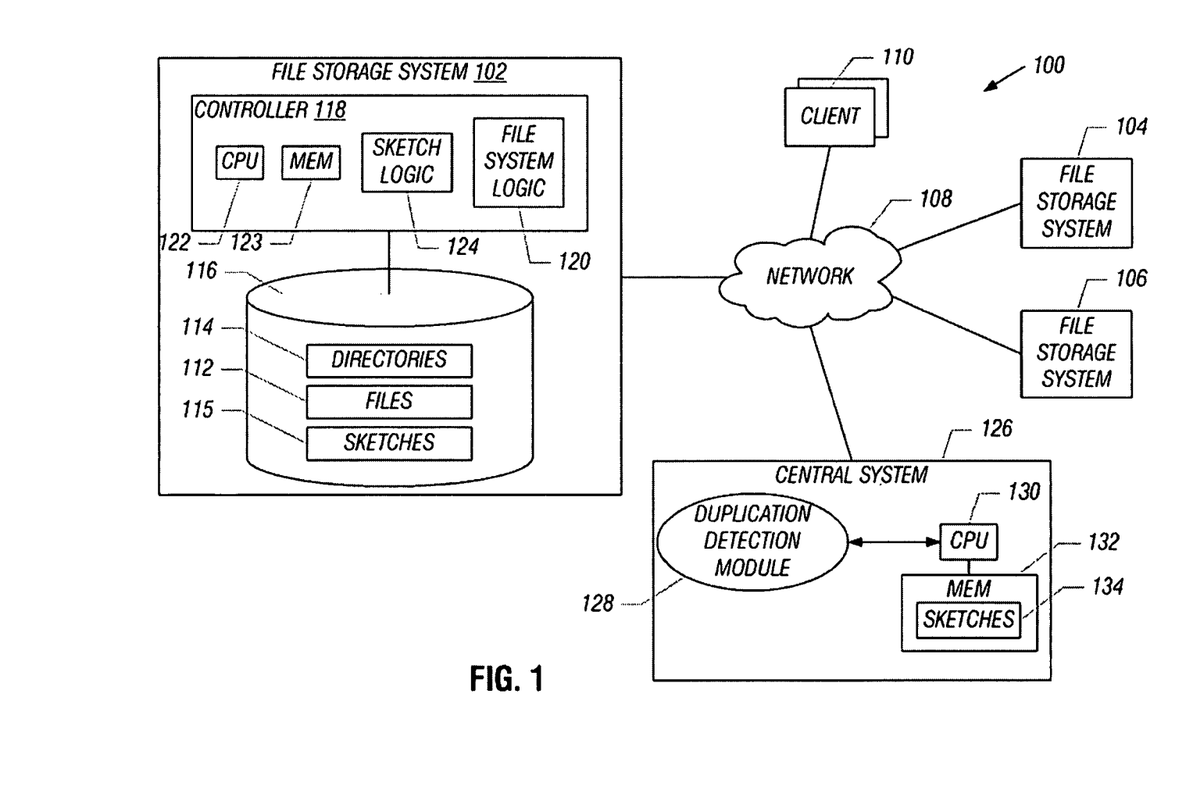
FIG. 1 is a block diagram of an example storage system that is capable of incorporating an embodiment of the invention.

FIG. 1 illustrates an exemplary arrangement that includes a number of file storage systems 102, 104, and 106, which are connected to a network 108. The file storage systems 102, 104, and 106 store files and directories containing the files (such as files 112 and directories 114) stored in a storage device 116 in the file storage system 102. A "storage device" can refer to a single storage device or multiple storage devices. One or more client computers 110 are able to access (read or write) files and directories in the file storage system 102 over the network 108.

As depicted in FIG. 1, the file storage system 102 includes a controller 118 to control access of the storage device 116. The controller 118 can include file system logic 120 (executable on one or more central processing units (CPUs) 122) that is used to store and organize the directories and files stored in the storage device 116. In accordance with some embodiments, the controller 118 also includes sketch logic 124 to compute sketches for the directories 114 to enable comparisons of directories to determine whether directories are duplicative. The sketch logic 124 is also executable on the one or more CPUs 122. A memory 123 is connected to the CPU(s) 122.

The file storage systems 104 and 106 can each include a controller and storage device similar to the controller 118 and storage device 116 of the file storage system 102.

Although a single controller 118 and storage device 116 are depicted, note that the file storage system 102 can actually be a distributed file storage system having a plurality of storage servers (multiple controllers and storage devices). Also, in one example, the file storage systems 102, 104, and 106 can be distributed across multiple geographic locations of an enterprise (e.g., company, government agency, educational facility, etc.) that has multiple locations throughout a country or the world. Thus, as one example, the file storage system 102 can be the file storage system for the enterprise in Houston, Tex., while the file storage system 104 can be located in Palo Alto, Calif., and the file storage system 106 can be located in Tokyo, Japan.

To avoid excessive traffic over the network 108, it is desirable to use a local sketch logic (e.g., sketch logic 124) in each file storage system to calculate sketches 115 based on the directories and files of the local file storage system. These sketches 115 can then be communicated over the network 108 for purposes of further assembly or manipulation to enable for directory duplication detection. Note that the sketches generated by the sketch logic 124 have sizes that are significantly smaller than the sizes of the underlying directories and files, so that network bandwidth consumed by communication of such sketches 115 is relatively small.

In the example depicted in FIG. 1, the sketches 115 produced by the sketch logic 124 in each corresponding file storage system are communicated over the network 108 to a central system 126 (e.g., a computer), which includes a duplication detection module 128 executable on one or more CPUs 130. The CPU(s) 130 is (are) connected to a memory 132. The sketches 115 generated by the sketch logic 124 in each of the file storage systems 102, 104, and 106 are collectively stored as 134 in the memory 132 of the central system 126.

Although multiple file storage systems 102, 104, and 106 are depicted in FIG. 1, along with the central system 126, for performing duplication detection, it is noted that a different implementation can include just a single file storage system, with the duplication detection module 128 provided in such file storage system for detecting duplicative directories.

As noted above, a sketch for a particular directory is a collection of values computed based on the files contained in the particular directory. For example, hashes can be computed by applying a hashing function on each of the files, where the output hash (or hash value) is an integer (or some other type of value) produced from an input value. The hash that is generated for each file can be relatively highly unique to that file. The input to the hash function can include any one or more of the content of the file, the file name of the file, and the file size of the file. Producing a hash value based on just a file name or the combination of the file name and file size is computationally much less intensive than producing a hash on the entire file content. Determining a file size costs nothing in terms of input/output (I/O) access since the file metadata structure has already been retrieved from disk when one reads the directory listing the file.

For a given directory, a collection of n hashes is used as the directory's sketch. If a directory contains more than n files, then a subset of all of the hashes computed for the files of the directory is used, where the subset can be the n maximum hashes, n minimum hashes, or some other subset selected based on some other criterion.

In an alternative embodiment, instead of generating just one hash for each file, n hashes can be computed for each file. Assuming there are m files in the directory, where m≥1, then m×n hashes will be produced. From the m×n hashes, n hashes are selected according to some criterion (described further below). A benefit of using this latter approach rather than the approach discussed above (one hash per file) is that n hashes can still be computed even if m<n (in other words, the number of files in the directory is less than n).

In accordance with some embodiments, the computation of sketches starts with the lowest level directories in the hierarchy of the file storage system, and proceeds upwardly to higher level directories. Such a bottom-up approach to compute sketches allows sketches computed for lower level (descendant) directories to be used when computing sketches of higher level (ancestor) directories. The bottom-up approach allows sketches of all directories to be computed while every node in the structure (a file or directory) is touched only once (in other words, a file or directory does not have to be scanned multiple times for computing sketches for all directories in the hierarchy). As a result, computational efficiency is improved.

Sketches for various directories of a file storage system are communicated to the central system 126 for duplication detection. Note that the central system 126 would also have received sketches from other file storage systems. The sketches are assembled or combined at the central system 126 to enable detection of duplicative directories. Upon detection of duplicative directories, the duplication detection module 128 in the central system 126 performs an action, such as outputting identifiers of duplicative directories to a user, flagging duplicative directories as candidates for deletion (such as part of a garbage collection procedure), and so forth.

Figure 2:
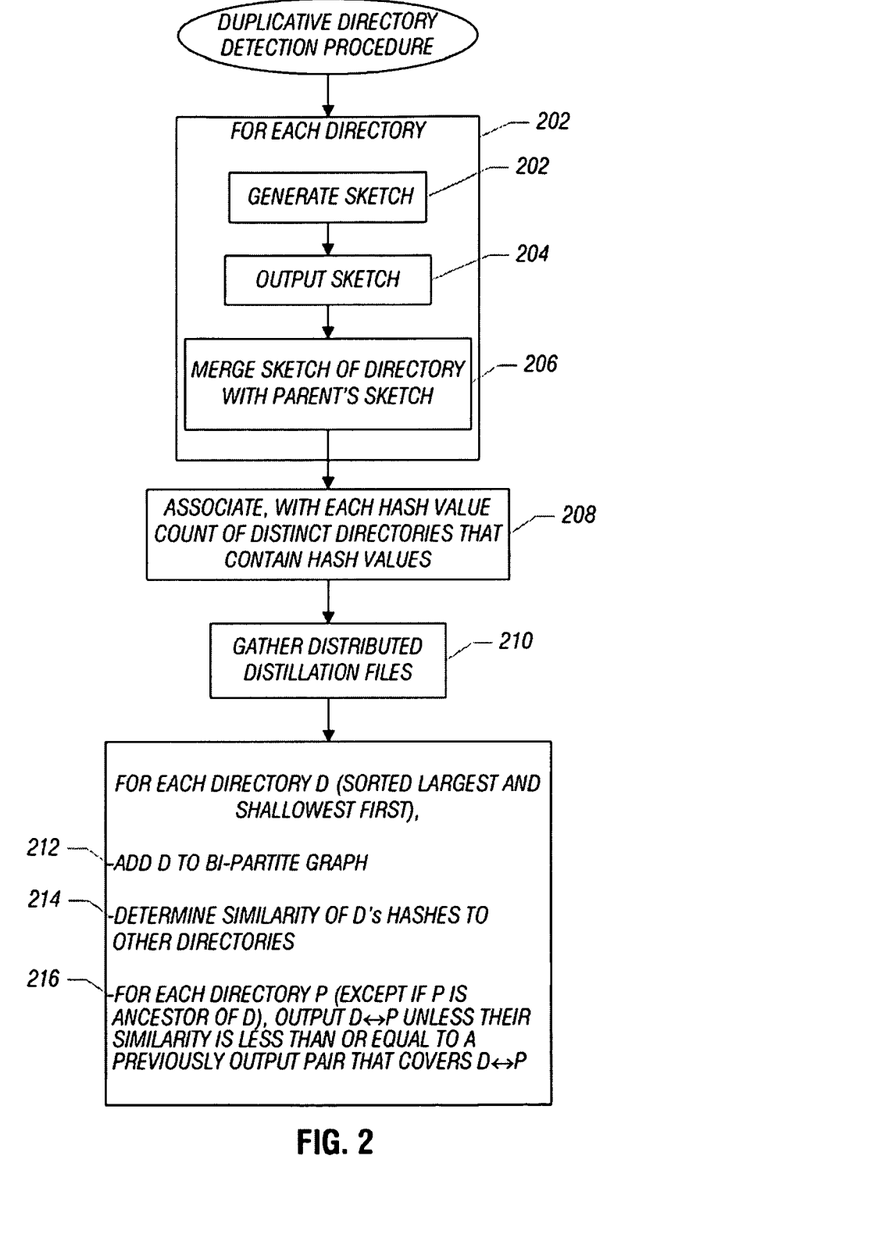
FIG. 2 is a flow diagram of a process of detecting duplicative directories, according to an embodiment.

FIG. 2 shows a procedure according to an embodiment of performing detection of duplicative directories. The process of FIG. 2 is performed by the sketch logic 124 and/or the duplication detection module 128 of FIG. 1.

The duplicative directory detection procedure generates (at 202) a sketch for each directory. Within a file storage system, for directories at the same hierarchical level, the generation of sketches for corresponding directories at the same hierarchical level can be performed in parallel. Also, note that the generation of sketches can also be performed concurrently in other file storage systems.

In a first embodiment, for each directory, individual hashes are computed for the corresponding files of each directory (one hash computed for each file). From among the hashes, n hashes (assuming there are at least n files in the directory) are selected as being part of this sketch. In this first embodiment, if there are less than n files in the directory, then the number of hashes selected would be less than n hashes. A convenient way to keep track of the selected n hashes is to use a known-manner heap structure of size n. The heap is initially empty, and as hashes are generated, the hashes are maintained so as to make it easy to remove the minimum element. Once the heap has become full, then a new hash would be added to the heap and the minimum element removed, thus maintaining the n largest hash values. (Similarly, a max-heap can be used for an alternate embodiment that tracks the n minimum hashes).

In addition to generating hashes for files of the directory, other parameters are also computed, including an F parameter (to indicate the number of files in the directory), and an S parameter (to indicate the total size of the directory, which is based on the summation of the sizes of the corresponding files in the directory). The procedure then outputs (at 204) the sketch for each directory. In one embodiment, the sketch for a particular directory has the following exemplary format: <directory path, S, F, n hashes>. The sketch can be written in one line of a text file, in one exemplary implementation.

In an alternative embodiment, the sketch that is generated and output at 202 and 204 is produced differently. In this alternative embodiment, a number of hash functions $h_1$, $h_2$, ..., $h_n$ are defined, where these n functions are part of a family H of functions. In one embodiment, a single hash function can be recomputed with a different known-manner salt prefix added to the input, e.g. $h1(x)=h(1+x)$, $h2(x)=h(2+x)$, et seq. This embodiment requires n separate computations of the hash function h.

In another embodiment, which requires much less computational burden, the hash functions are computed as permutations of a vector of bytes $[b_1, b_2, \ldots, b_{16}]$, or permutations of other collections of value elements. For example, the vector of bytes can be bytes of a hash produced by another hash function applied to an attribute of a file (file name plus size, file name, or content of file). This other hash function can be the well-known MD5 hash function, which produces as an output a 16-byte hash value, $[b_1, b_2, \ldots, b_{16}]$. In other implementations, other types of hash functions can be used to produce the vector of bytes $[b_1, b_2, \ldots, b_{16}]$. A functions h (one of $h_1, h_2, \ldots, h_n$) is a permutation of the vector of bytes $[b_1, b_2, \ldots, b_{16}]$, where the permutation selects a subset of the bytes $[b_1, b_2, \ldots, b_{16}]$ in some random order. For example, the permutation $h_1$ can select bytes $[b_2, b_8, b_3, b_1, b_7, b_{15}, b_{13}, b_{11}]$ (assuming that an 8-byte output is desired from the permutation function). In another example, the permutation function $h_2$ of $[b_1, b_2, \ldots, b_{16}]$ can produce the following output (another 8-byte sequence): $[b_4, b_9, b_{14}, b_{13}, b_{15}, b_2, b_{10}, b_{12}]$. The other functions h produce other permutations of the 16 bytes.

The same permutation functions are applied to the vector of bytes produced for each file (in other words, $h_1$ produces the same permutation of bytes for each file, $h_2$ produces the same permutation of bytes for each file, and so forth). Note that although the permutation of bytes (resulting in the specific selected sequence of bytes) is the same, the values of those bytes are different since the hash produced for the different files are likely to be different (unless the files are duplicates in which case the hash will be the same and the corresponding permutations would also be the same).

More formally, a permutation function h is represented by a random permutation of the set $I_{16} = \{1, 2, 3, \ldots, 16\}$ (assuming a 16-byte hash value):

Choose, uniformly and at random, a permutation p of $I_{16}$;
Represent 16 byte integers as a vector of bytes $[b_1, b_2, \ldots, b_{16}]$;
Then $h([b_1, b_2, \ldots, b_{16}]) = [b_{p(1)}, b_{p(2)}, \ldots, b_{p(16)}]$.

As noted above, each permutation h applied to the 16-byte vector $[b_1, b_2, \ldots, b_{16}]$ produces an 8-byte output (instead of a 16-byte output) to provide improved computational efficiency. In some embodiments, only the first 8 bytes of each permutation is used in order to generate an 8-byte output.

Using the technique above, for each file, n output values are generated, corresponding to the n permutation functions $h_1, h_2, \ldots, h_n$. If there are m files, then m×n permutation output values would be generated for the directory. The output permutation values produced by the permutation function $h_1$ for the files in the directory can be represented as $h_1(S)$, where S is the set of m hashes produced for the m files. Similarly, the output permutation values for permutation functions $h_2$ is represented as $h_2(S)$. More generally, $h_i(S)$, i=1 to n, includes $\{h_i(s_1), h_i(s_2), \ldots, h_i(s_m)\}$.

For each $h_i(S)$, the minimum output permutation value is selected. Let $\min(h_i(S))$ be the minimum of the set $\{h_i(s_1), h_i(s_2), \ldots, h_i(s_m)\}$. In this embodiment, the sketch for a directory is expressed as follows: $[\min(h_1(S)), \min(h_2(S)), \ldots, \min(h_n(S))]$. Basically, the sketch includes a collection of n values, where each value i of the n values is the minimum of the output permutation values produced by the corresponding permutation function $h_i$. For example, to calculate value i in the sketch, the permutation function $h_i$ is applied to the m files of the directory to produce m permutation values. In one embodiment, the value i is the minimum of the m permutation values. In this implementation, the family of permutation functions $h_1, h_2, \ldots, h_n$ is referred to as a min-wise independent family H of permutations over a universe.

Instead of using a min-wise independent family H of permutations, a different implementation can involve selecting a maximum of output permutation values produced by each permutation function. Selecting a minimum or maximum is generally referred to as selecting an extreme.

Once the sketch for each directory is output, the procedure of FIG. 2 merges (at 206) the sketch of each directory with the sketch of the directory's parent. A useful property of sketches according to some embodiments is incrementality, which is expressed as follows: given the sketches of two sets S and S', it is relatively easy to compute the sketch of the set S∪S' as follows: Let $[k_1, k_2, \ldots k_n]$ be the sketch of S, and $[k'_1, k'_2, \ldots k'_n]$ be the sketch of S'. Then $[\min(k_1, k_1'), \min(k_2, k_2'), \ldots, \min(k_n, k_n')]$ is the sketch of S∪S'. Alternatively, the sketch of S∪S' is the maximum n values of $\{k_1, k_2, \ldots k_n, k'_1, k'_2, \ldots, k'_n\}$. Incrementality allows a parent's sketch to be computed from a sketch of a child directory, without having to recompute hashes for files in the child directory. In embodiments in which a bottom-up approach is used in traversing a hierarchical arrangement of directories, the incrementality characteristic of the sketches used according to some embodiments enhances computational efficiency.

In the case in which a directory has been compressed, such as by using a zip program, the compressed file (e.g., .zip file) can be processed as if it were a directory. The sketch output for the .zip file would be similar to the sketch of a directory, but the size of the .zip file would be the compressed size, rather than the sum of the uncompressed content of the .zip file. But for the hashes of the files within the archive, their uncompressed sizes are used (so that they would match with an uncompressed copy of the file in the file system, or a copy inside another archive that achieved a different level of compression).

Given the sketches associated with the directories, some similarity function can be defined to compute similarities between or among plural directories.

An optional task performed by the duplicative directory detection procedure is the association (at 208), for each hash value, a count of distinct directories that contain the hash value. "Distinct" directories do not include directories that have an ancestor-descendent relationship. In other words, directories that have an ancestor-descendent relationship are not considered distinct directories. However, separate directories that do not have the ancestor-descendant relationship are considered distinct. For example, if directories /A1/B/ and /A1/ and /A2/ each contain a particular hash value, then the count of the number of distinct directories that contain such hash value is 2 (since /A1/B/ is excluded because it is a sub-directory of /A1/). Maintaining a count for each hash value allows the procedure to later identify hash values that are associated with a count of 1 (in other words, such hash values are associated with files that appear in just one distinct directory). Such hash values can be ignored for the purpose of identifying duplicative directories, since such hash values are known to appear in just one distinct directory. This allows a large number of hash values to be ignored when performing duplication detection, which enhances computational efficiency.

Each file storage system produces a distillation file that contains sketches for corresponding directories in the file storage system. In one example format, the distillation file can include multiple lines that each contains a sketch for one directory. Other formats can be used in other implementations. The distributed distillation files from different file storage systems are gathered (at 210), which is accomplished by each file storage system sending its respective distillation file to the central system 126 (FIG. 1). Note that the counts of hash values from each file storage system can also optionally be forwarded to the central system 126. Alternatively, the task (208) of associating counts with hash values can be performed at the central system 126 after all distillation files have been combined. The distillation files have sizes that are small fractions of the total sizes of the underlying directories. Therefore, consumption of network bandwidth is relatively small.

At the central system 126, the duplication detection module 128 call merge the hash value-count data (in the implementation where counts are maintained). As part of the merge-sort operation of the hash value-count data, the counts are aggregated. The output of the merge-sort operation is produced as a cumulative collision count for each hash value, where hash values and associated counts for those hash values with count greater than 1 are stored in a collision set C. The number of hash values that are stored in C is likely to be a relatively tiny fraction of all hash values that have been generated, since the vast majority of files are not duplicated.

Alternatively, instead of merging hash value-count data from different file storage systems, the calculation of counts for hash values can be performed at the central system 126, where a single pass is made through the combined distillation files.

In computing counts for hash values, according to an embodiment, a hash value is output to a temporary file when the hash value fails to propagate to its parent's sketch, or else when the hash value propagates all the way to the root. For example, if a particular hash value X first appears in the sketch of sub-directory U/V/W/ and X propagates up to the sketch of ancestor directory U/V/ and also directory U/, then these three occurrences stem from only a single origin and X is output only once to the temporary file—when X fails to propagate to the parent of U/ or else when X reaches the root /. On the other hand, if the same hash value X later originates in a sketch of a different branch U'/V/W/, perhaps in a separate distillation file, then the hash value would be output a second time to the temporary file.

The temporary file of hash values is then sorted by using a merge-sort operation, such as with a UNIX or DOS sort utility program. Any hash value that occurs more than once in the sorted output represents a file that appears in multiple sub-directories, and may contribute to discovering substantially similar (duplicative) directories.

Note that any directory whose it hash values are completely eliminated are also omitted from further processing. Although identification of single occurrences of hash values as discussed above is optional, such identification has the benefit of greatly improving the scalability of the remaining analysis, since memory and processing resources are used only for the relatively few directories that do have some degree of duplication.

Figure 3:
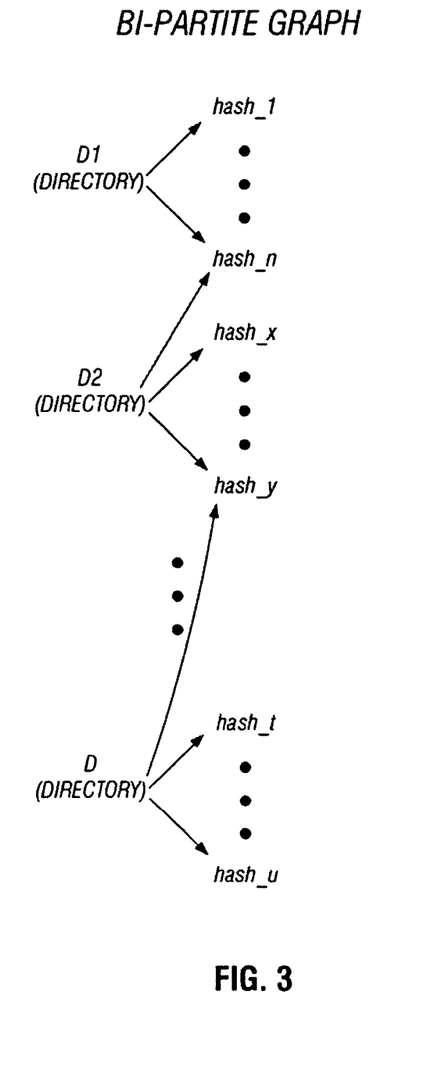
FIG. 3 shows an example bi-partite graph according to an embodiment.

To discover interesting pairs of duplicative directories, the procedure builds a reverse index of the sketch values pointing back to the directories from which the sketch values are derived. In one example, the reverse index is in the form of a bi-partite graph of directories and their corresponding sketch values. Thus, as depicted in FIG. 3, for each directory D (sorted largest first and breaking ties by selecting shallower nesting depth first) that is associated with a hash value in the collision set C (hash value having a count greater than one), the directory D is added (at 212) to the bi-partite graph. FIG. 3 shows directories D1 and D2 already added to the bi-partite graph before D, as well as their sketch hashes. Each directory D1 or D2 is associated with a respective sketch (of hashes).

For improved efficiency, the largest and shallowest are analyzed first. This is due to the fact that if there are a very large number of directories with some degree of similarity, then an approach that does not start with the largest directories may find many subordinate directories that are very similar, which can overwhelm the procedure. For example, a higher level directory /A/ can contain sub-directories /A/1/, /A/2/, . . . , /A/m/, and another higher level directory /A'/ may also contain the same sub-directories, /A'/1/, /A'/2/, . . . , /A'/m/. It would be more desirable to discover the pair /A/ and /A'/ first to avoid the overhead of discovering the many subordinate pairs of duplicate sub-directories.

To accomplish this, all directories are sorted by their cumulative content size, largest first (favoring shallower depth in case of ties), and then building up the bi-partite graph incrementally by successively registering directories in the bi-partite graph. In the example above, /A/ may be registered first in the bi-partite graph, with no duplicate directories discovered at that time. Later, when /A'/ is registered, the sketch of /A'/ will be found to be substantially similar to the sketch of /A/ and the pair will be discovered before their sub-directories are linked in the bi-partite graph.

Figure 4:
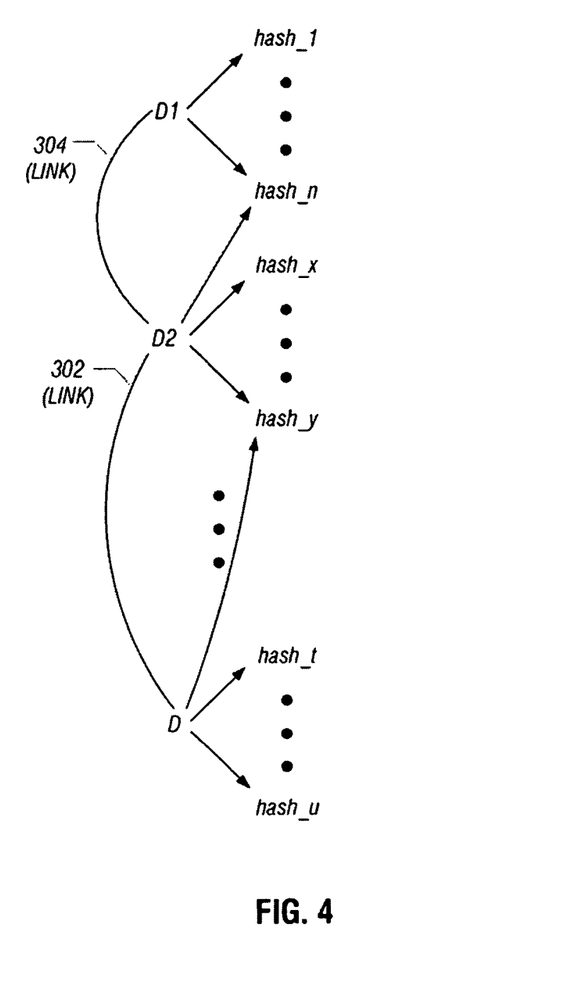
FIG. 4 shows an example graph according to an embodiment to illustrate weighted links between directories.

The similarity of D to other directories previously registered is next determined (at 214) by determining how many of D's sketch hashes are common with hashes of previously registered directories. As depicted in FIG. 4, in another graph, each node (representing a directory) has a weighted link to another node (another directory) if the directories share at least one hash in their respective sketches. FIG. 4 shows weighted links 302 and 304. Link 302 is between nodes for directories D2 and D, and link 304 is between nodes for directories D1 and D2.

Each weighted link has a score based on some combination of the following: (1) the minimum cumulative size S of the two directories; (2) the minimum number of files F of the two directories; (3) the edge weight (percentage of hashes that match; (4) the degrees of similarity in the directory names disregarding that file path prefixes; and/or (5) the number of direct children file names or directory names in common. Other techniques for computing scores for the links of the bi-partite graph can be used in other implementations. The scores are used to determine similarity of directories.

For each directory P that is discovered to share some similarity to a previously registered directory D in the bi-partite directory-hash graph of FIG. 3, an output D⇆P is provided (at 216) unless D is an ancestor of P or the similarity of D and P is less than or equal to the similarity of a previously output pair that covers D⇆P. In other words, if ancestor directories containing D and P have already been identified as duplicative, then D⇆P is not outputted. Directories naturally share self-similar hashes with their parents and higher ancestors. When each such pairing is discovered, the ancestor relation is tested to omit the relation from the pool of interesting findings.

Consider for example two directories /U/ and /U'/ that share some level of similarity (e.g., 14 of 16 hashes in common), and their subdirectories /U/V/ and /U'/V/ share a greater level of similarity (e.g., 16 hashes in common). The filter performed at 216 would consider filtering away the latter pair /U/V/ and /U'/V/ because this pair is covered by the pair /U/ and /U'/, but would not filter it away because the similarity of the latter pair exceeds that of the previously output pair.

Instructions of software described above (including sketch logic 124, duplication detection module 128 of FIG. 1) are loaded for execution on a processor (such as one or more CPUs 122 in FIG. 1). The processor includes microprocessors, microcontrollers, processor modules or subsystems (including one or more microprocessors or microcontrollers), or other control or computing devices. A "processor" can refer to a single component or to plural components.

Data and instructions (of the software) are stored in respective storage devices, which are implemented as one or more computer-readable or computer-usable storage media. The storage media include different forms of memory including semiconductor memory devices such as dynamic or static random access memories (DRAMs or SRAMs), erasable and programmable read-only memories (EPROMs), electrically erasable and programmable read-only memories (EE-PROMs) and flash memories: magnetic disks such as fixed, floppy and removable disks; other magnetic media including tape; and optical media such as compact disks (CDs) or digital video disks (DVDs). Note that the instructions of the software discussed above can be provided on one computer-readable or computer-usable storage medium, or alternatively, can be provided on multiple computer-readable or computer-usable storage media distributed in a large system having possibly plural nodes. Such computer-readable or computer-usable storage medium or media is (are) considered to be part of an article (or article of manufacture). An article or article of manufacture can refer to any manufactured single component or multiple components.

In the foregoing description, numerous details are set forth to provide an understanding of the present invention. However, it will be understood by those skilled in the art that the present invention may be practiced without these details. While the invention has been disclosed with respect to a limited number of embodiments, those skilled in the art will appreciate numerous modifications and variations therefrom. It is intended that the appended claims cover such modifications and variations as fall within the true spirit and scope of the invention.

What is claimed is:

1. A method comprising:
generating, for hierarchically arranged plural sets of files, respective collections of values computed based on files in corresponding sets of files, wherein generating the respective collections of values is performed by a system including a processor, and wherein computing a particular collection of values for a particular set of files of the plural sets of files comprises:
computing a first number of values based on the files of the particular set of files, the first number of values computed by applying plural functions on each file of the particular set of files, and
selecting a second number of values from the first number of values, where the second number of values is less than the first number of values, and the second number of values are output as the particular collection of values;
generating, by the system for a further set of files that is an ancestor of at least a given set of files of the plural sets of files, a respective collection of values that is based on a collection of values computed for at least the given set of files; and
identifying, by the system, duplicative sets of files according to comparisons of collections of values including the collections of values for the plural sets of files, and the collection of values for the further set of files.

2. The method of claim 1, wherein generating the collections of values for the plural sets of files and the further set of files comprises generating collections of values for corresponding directories.

3. The method of claim 1, wherein computing the particular collection of values for the particular set of files comprises:
computing a respective group of values based on applying the plural functions on each corresponding file of the particular set of files, wherein multiple groups of values are formed by applying the plural functions on the files of the particular set of files, the multiple groups of values collectively forming the first number of values.

4. The method of claim 3, wherein the plural functions are plural hash functions, and wherein computing the respective group of values comprises:
applying the plural hash functions on each corresponding file of the particular set of files to compute a respective group of hash values, wherein multiple groups of hash values are formed by applying the plural hash functions on the files of the particular set of files, the multiple groups of hash values forming a first number of hash values; and
selecting a second number of hash values from among the first number of hash values to output as the particular collection of values.

5. The method of claim 4, wherein applying the plural hash functions comprises applying plural permutations to a hash value of each file of the particular set of files.

6. The method of claim 4, wherein selecting the second number of hash values to output as the particular collection of values for the particular set of files comprises:
adding hash values for the respective files of the particular set of files to a data structure; and
once the data structure has become full, removing hash values from the data structure according to a criterion to make room for adding additional hash values.

7. The method of claim 6, wherein adding hash values to the data structure comprises adding the hash values to a heap.

8. The method of claim 1, further comprising:
determining a count of each of the values in the collections of values for the plural sets of files and the collection of values for the further set of files, to track values that originate in more than one set of files, wherein the count of each of the values comprises a count of distinct directories that contain the respective each value,
wherein identifying duplicative sets of files takes into account the counts.

9. The method of claim 8, further comprising:
pruning values from the collections of values for the plural sets of files and the collection of values for the further set of files, where the pruned values originate in just one set of files; and
removing a first set of files from further processing responsive to all values in a collection of values for the first set of files having been pruned.

10. The method of claim 1, further comprising:
adding values and sets of files to a bi-partite graph, wherein the bi-partite graph has nodes representing respective sets of files, and wherein nodes corresponding to sets of files sharing at least one file are linked,
wherein identifying the duplicative sets of files uses the bi-partite graph.

11. The method of claim 10, further comprising:
adding a first set of files to the bi-partite graph; and
outputting a first pair of sets that includes the first set of files and a second set of files unless the second set of files is an ancestor of the first set of files.

12. The method of claim 1, wherein identifying the duplicative sets of files comprises identifying a first set of files of the plural sets of files as being duplicative of a second set of files of the plural sets of files based on comparing a collection of values for the first set of files with a collection of values for the second set of files.

13. The method of claim 12, wherein the collection of values for the first set of files is a collection of hash values computed based on files of the first set of files, and the collection of values for the second set of files is a collection of hash values computed based on files of the second set of files.

14. The method of claim 1, wherein the first number of values include plural values, and the second number of values include plural values.

15. A method comprising:
generating, for hierarchically arranged plural sets of files, respective collections of hash values computed based on files in corresponding sets of files, wherein generating the respective collections of values is performed by a system including a processor, and wherein computing a particular collection of hash values for a particular set of files of the plural sets of files comprises:
applying plural hash functions on each file of the particular set of files to compute a respective group of hash values, wherein multiple groups of hash values are formed by applying the plural hash functions on the files of the particular set of files;
selecting a second number of hash values from among the first number of hash values to output as the particular collection of hash values, where the second number of hash values is less than the first number of hash values, and wherein selecting the second number of hash values comprises selecting an extrema of the hash values computed by each of the plural hash functions on the files of the particular set of files;
generating, by the system, for a further set of files that is an ancestor of at least a given set of files of the plural sets of files, a respective collection of hash values that is based on a collection of hash values computed for at least the given set of files; and
identifying, by the system, duplicative sets of files according to comparisons of collections of hash values including the collections of hash values for the plural sets of files, and the collection of hash values for the further set of files.

16. A system comprising:
at least one processor to:
compute sketches for corresponding plural directories, wherein the sketches contain hash values based on files in the plural directories, and wherein computing a particular sketch for a particular directory of the plural directories comprises:
computing a first number of hash values based on files in the particular directory, the first number of hash values computed by applying plural hash functions on each file of the particular directory, and
selecting a second number of hash values from the first number of hash values to output as the particular sketch for the particular directory, where the second number of hash values is less than the first number of hash values;
compute a further sketch for a further directory that is an ancestor of at least a given directory of the plural directories, wherein the further sketch contains hash values including one or more hash values from a sketch of at least the given directory; and
identify duplicative directories based on comparing sketches including the sketches for the plural directories and the further sketch.

17. The system of claim 16, wherein identifying the duplicative directories comprises identifying a first directory of the plural directories as being duplicative of a second directory of the plural directories based on comparing a sketch for the first directory with a sketch for the second directory, where the sketch for the first directory includes plural hash values, and the sketch for the second directory includes plural hash values.

18. The system of claim 16, wherein applying the plural hash functions on each corresponding file of the particular directory produces a respective group of hash values, wherein multiple groups of hash values are formed by applying the plural hash functions on the files of the particular directory, the multiple groups of hash values collectively forming the first number of hash values.

19. The system of claim 18, wherein selecting the second number of hash values comprises selecting an extrema of hash values in each of the multiple groups of hash values.

20. An article comprising at least one non-transitory computer-readable storage medium storing instructions that when executed cause a computer to:
receive, for hierarchically arranged plural sets of files, respective collections of values computed based on files in corresponding sets of files, wherein a particular collection of values for a particular set of files of the plural sets of files is computed by:
computing a first number of values based on the files of the particular set of files, the first number of values computed by applying plural functions on each file of the particular set of files, and
selecting a second number of values from the first number of values, where the second number of values is less than the first number of values, and the second number of values is included in the particular collection of values;
receive, for a further set of files that is an ancestor of at least a given set of files of the plural sets of files, a respective collection of values that is based on a collection of values computed for at least the given set of files; and
identify duplicative sets of files according to comparisons of collections of values including the collections of values for the plural sets of files, and the collection of values for the further set of files.

21. The article of claim 20, wherein identifying the duplicative sets of files comprises identifying a first set of files of the plural sets of files as being duplicative of a second set of files of the plural sets of files based on comparing a collection of values for the first set of files with a collection of values for the second set of files.

22. The article of claim 20, wherein the first number of values include plural values, and the second number of values include plural values.

23. The article of claim 20, wherein the plural functions are plural hash functions that are applied on each corresponding file of the particular set of files to form a respective group of hash values, wherein multiple groups of hash values are formed by applying the plural hash functions on the files of the particular set of files, the multiple groups of hash values forming a first number of hash values, and
wherein selecting the second number of values comprises selecting a second number of hash values from among the first number of hash values to output as the particular collection of values, where selecting the second number of hash values comprises selecting an extrema of hash values in each of the multiple groups of hash values.

* * * * *